United States Patent [19]
Bader et al.

[11] Patent Number: 5,649,008
[45] Date of Patent: Jul. 15, 1997

[54] CIRCUIT AND METHOD OF REDUCING SIDETONE IN A RECEIVE SIGNAL PATH

[75] Inventors: Scott K. Bader, Gilbert; Richard E. Hester, Phoenix; Michael L. Gomez, Tempe, all of Ariz.; James S. Mielke, Wauconda, Ill.

[73] Assignee: Motorola, Inc., Schaumburg, Ill.

[21] Appl. No.: 284,950

[22] Filed: Aug. 2, 1994

[51] Int. Cl.[6] .................................................. H04M 9/08
[52] U.S. Cl. ............................ 379/392; 379/406; 379/409; 379/390
[58] Field of Search ................................ 379/391, 392, 379/395, 406, 409, 388, 389, 390

[56] References Cited

U.S. PATENT DOCUMENTS 5,012,139 4/1991 Susak et al. .
5,245,299 9/1993 Bader et al. .

Primary Examiner—Thomas W. Brown
Assistant Examiner—T. Devendra Kumar
Attorney, Agent, or Firm—Robert D. Atkins

[57] ABSTRACT

A cordless telephone has receive (12) and transmit (14) signal paths for passing voice signals. Sidetones normally appear in the receive signal path from the near party's voice. A signal strength comparator (34) monitors the transmit signal path and the receive signal path and asserts a gain control signal when the transmit path signal strength exceeds a threshold set to a predetermined value below the receive path signal strength. The gain control signal decreases the gain (42) in the receive signal path to reduce undesirably loud sidetones in the speaker earpiece. When the transmit path signal strength is less than the predetermined threshold, the gain control signal is not asserted allowing maximum amplification in the receive signal path as the sidetone is sufficiently small as to not interfere with the main received voice signal, or otherwise become noticeably loud in the speaker earpiece.

20 Claims, 3 Drawing Sheets

10

CIRCUIT AND METHOD OF REDUCING SIDETONE IN A RECEIVE SIGNAL PATH

BACKGROUND OF THE INVENTION

The present invention relates in general to telecommunication systems and, more particularly, to reducing sidetone in the receive signal path of a telecommunication system.

Telecommunication systems having transmit and receive signals paths are commonly used in applications such as cordless telephones, cellular telephones, corded telephones, and many other two-way communication devices. Cordless telephones for example are widely used in residential and commercial environments because of their flexibility in allowing the user to venture some distance from the base unit during the conversation. The near party speaks into the handset microphone and the voice data is transmitted by RF link to the base unit. The base unit sends the voice data across hard-wire telephone lines to the far party on the other end. Voice signals from the far party are received from the hard-wire telephone lines by the base unit and transmitted over the RF link to the handset to complete the two-way conversation.

When the near party speaks into the microphone, a sidetone signal is typically generated between the microphone and earpiece so that the near party can hear his/her own voice. Some sidetone in the earpiece is desirable so that the near talker does not believe the telephone line to be dead while the far party is listening. On the other hand, the sidetone should not overwhelm or interfere with the far party's voice when both parties are speaking at once.

The conventional interface for cordless telephones is a four-wire to two-wire conversion circuit that allows the transmit and receive signals of the base unit to be interfaced with the two-wire telephone line. The four-wire to two-wire interface typically has impedance mismatches that cause reflections of voice signals back in the transmit path of the base unit. The reflections increase sidetone in the near party's earpiece. If the sidetone volume becomes sufficiently loud it may interfere with the far party's voice. Furthermore, the loud sidetone may cause the near talker to reduce his/her own voice volume to a point that the far party may not be able to hear the conversation.

Hence, a need exists to reduce sidetones in the receive signal path of telecommunication systems.

DETAILED DESCRIPTION OF THE PREFERRED EMBODIMENT

Figure 1:
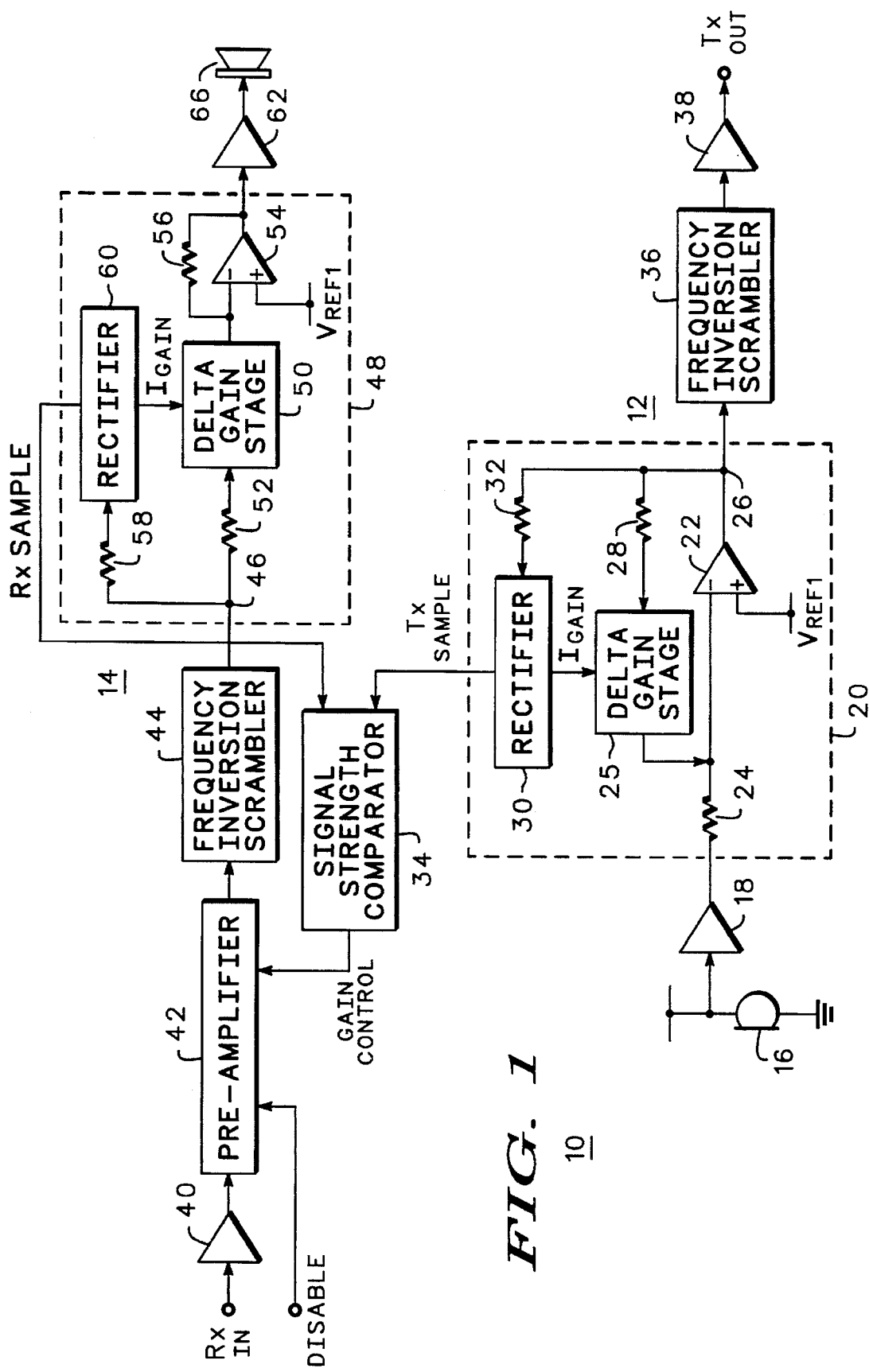
FIG. 1 is a block diagram illustrating a cordless telephone communication system.

Referring to FIG. 1, a telecommunication circuit 10 is shown with a transmit signal path 12 and a receive signal path 14 for example in a cordless telephone. An analog input signal TX IN representing audio originates from a microphone 16 in the cordless telephone handset. The TX IN audio signal processes through transmit signal path 12 that includes microphone amplifier 18 and compressor 20 as part of a compander circuit. Compressor 20 includes an amplifier 22 having an inverting input coupled through resistor 24 from the output of amplifier 18. The non-inverting input of amplifier 22 receives a reference potential $V_{REF1}$ operating at 1.5 volts. Delta gain stage 25 receives an output signal from amplifier 22 at node 26 through resistor 28. The output of delta gain stage 25 is coupled to the inverting input of amplifier 22. Rectifier circuit 30 has an input coupled to node 26 by way of resistor 32. Rectifier circuit 30 provides a control current $I_{GAIN}$ to delta gain stage 25, and a control signal TX SAMPLE to one input of signal strength comparator 34. The operation of compressor 20 is described in U.S. Pat. No. 5,245,299 and is hereby incorporated by reference. Briefly, compressor 20 compresses the dynamic amplitude range of an analog signal in preparation for transmission across a narrow-band transmission link.

The transmit signal at node 26 is processed through a frequency inversion scrambler 36 that inverts the frequency spectrum. Frequency inversion scrambler 36 is optional but useful in cordless telephones to add privacy of the transmitted signal. Further detail of frequency inversion scrambler 36 is provided in U.S. patent application Ser. No. 08/237,528, U.S. Pat. No. 5,528,692. The inverted frequency spectrum is buffered through amplifier 38 for providing the TX OUT output signal. The TX OUT signal is FM modulated, typically 46.0 to 49.0 MHz, and transmitted by radio link to the receive signal path in the base unit of the cordless telephone (not shown). The base unit receive signal path demodulates the signal and processes through another frequency inversion scrambler to re-invert it back to its original frequency spectrum. The signal is decompressed in a circuit arrangement similar to that in receive signal path 14 and transmitted over conventional TIP and RING telephone lines (not shown) to the far end talker.

When the far end talker sends a voice signal, a transmit path in the base unit receives the voice signal from the TIP and RING lines through a two-wire to four-wire interface and processes the voice signal through a compressor and frequency inversion scrambler as described in transmit path 12 of the handset. The compressed and inverted signal is FM modulated and transmitted to the handset where it is demodulated and applied as RX IN to amplifier 40 in receive signal path 14. The output of amplifier 40 is coupled to a pre-amplifier circuit 42 that is responsive to the GAIN CONTROL signal for changing the gain in receive signal path 14 between minimum and maximum values. The DISABLE control signal sets pre-amplifier 42 to maximum gain when asserted and disables the GAIN CONTROL signal. The output signal of pre-amplifier 42 is processed through frequency inversion scrambler 44 to re-invert the received signal back to its original frequency spectrum. Frequency inversion scrambler 44 is optional but useful in cordless telephones where in combination with frequency inversion scrambler 36 it provides privacy of the conversation between the parties. Further detail of frequency inversion scrambler 44 is provided in U.S. patent application Ser. No. 08/237,528. The output signal of frequency inversion scrambler 44 at node 46 is applied to expander 48 that is part of the compander.

Expander 48 includes a delta gain stage 50 that receives the signal at node 46 from frequency inversion scrambler 44 through resistor 52. The output of delta gain stage 50 is coupled to the inverting input of amplifier 54. The non-inverting input of amplifier 54 receives the reference potential $V_{REF1}$. The output of amplifier 54 is coupled through resistor 56 back to its inverting input. The receive signal at node 46 also goes through resistor 58 to rectifier circuit 60 for providing control signal $I_{GAIN}$ to delta gain stage 50. Rectifier circuit 30 further provides a control signal RX SAMPLE to a second input of signal strength comparator 34. The operation of expander 48 is discussed in U.S. Pat. No. 5,245,299 and is hereby incorporated by reference. Briefly, expander 48 decompresses the narrow-band compressed analog signal to return it to its full dynamic range for the near party to hear the received voice signal. The output signal of expander 48 is amplified by speaker amplifier 62 and drives speaker 66 in the handset earpiece.

As part of the present invention, rectifier circuit 30 and rectifier circuit 60 provide feedback signals TX SAMPLE and RX SAMPLE respectively to signal strength comparator 34 that in turn controls the gain of pre-amplifier 42. When the transmit signal at node 26 is less than the predetermined threshold, the TX SAMPLE causes signal strength comparator 34 to assert a high GAIN CONTROL signal to increase the gain of pre-amplifier 42. When the transmit signal at node 26 exceeds a predetermined threshold, the TX SAMPLE causes signal strength comparator 34 to assert a low GAIN CONTROL signal to decrease the gain of pre-amplifier 42 and thereby reduce sidetones in receive signal path 14. The RX SAMPLE sets the predetermined threshold at 1.5 dB below the receive signal at node 46. As will be shown, some hysteresis is built into signal strength comparator 34 to avoid oscillating about the receive signal level.

Figure 4:
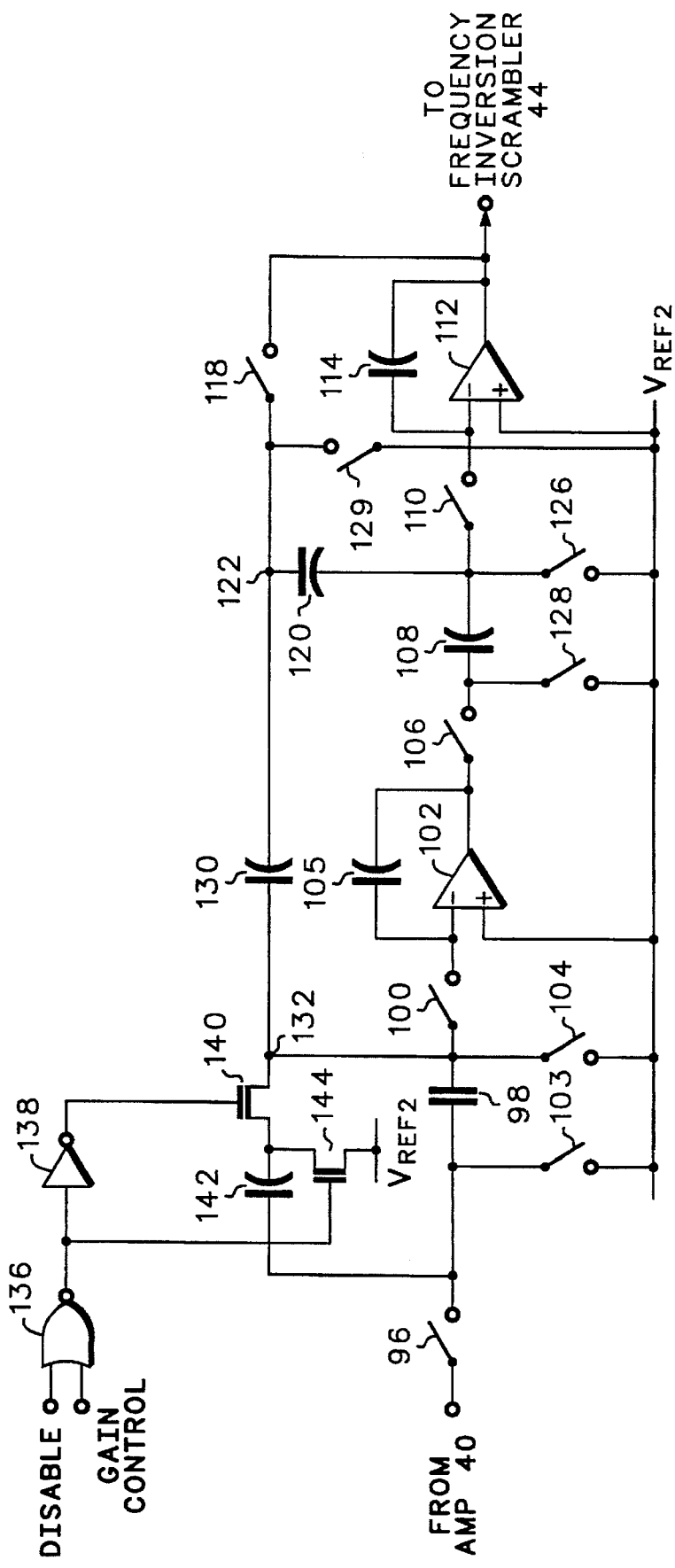
FIG. 4 is a schematic diagram illustrating the pre-amplifier of FIG. 1.

The tap point of rectifier circuit 30 and rectifier circuit 60 is provided in U.S. Pat. No. 5,012,139. In FIG. 4 of the U.S. Pat. No. 5,012,139, resistor $R_{IN}$ is equivalent to resistor 32 in the subject application and current $I_{OUT}$ provides the control signal $I_{GAIN}$ to delta gain stage 25 following a current mirror turn around (not shown). The TX SAMPLE is taken at the anode of diode 34 in FIG. 4 of the U.S. Pat. No. 5,012,139. Likewise, the rectifier/averaging circuit shown in FIG. 4 of the U.S. Pat. No. 5,012,139 is applicable to rectifier circuit 60 where resistor $R_{IN}$ is equivalent to resistor 58 and current $I_{OUT}$ provides control current $I_{GAIN}$ following a current mirror turn around (not shown). Again, the tap point for the RX SAMPLE signal is the anode of diode 34 in FIG. 4 of the U.S. Pat. No. 5,012,139. The TX SAMPLE control signal is proportional to the amplitude of the transmit signal at node 26. That is, as the near party's voice signal increases so does the TX SAMPLE signal. Similarly, the RX SAMPLE is representative of the far party's voice plus the sidetone generated by the near party that ultimately reaches the speaker earpiece. The RX SAMPLE control signal is proportional to the amplitude of the receive signal at node 46.

Figure 2:
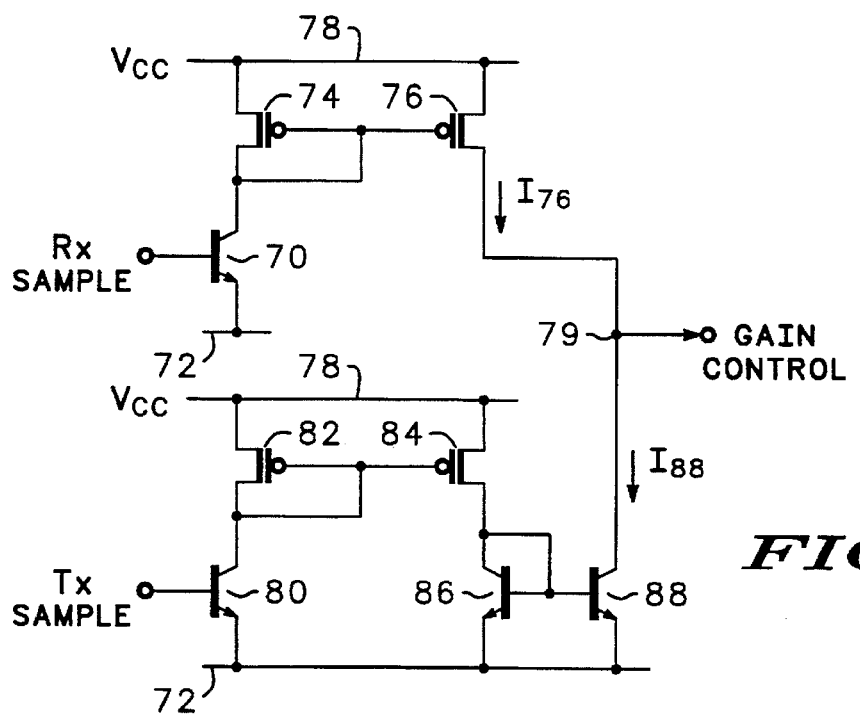
FIG. 2 is a schematic diagram illustrating the signal strength comparator circuit of FIG. 1.

Turning to FIG. 2, further detail of signal strength comparator 34 is shown with transistor 70 receiving the RX SAMPLE signal at its base. The emitter of transistor 70 is coupled to power supply conductor 72 operating at ground potential. The collector of transistor 70 is coupled to the input of a current mirror circuit comprising transistors 74 and 76. The drain and gate of transistor 74 is coupled to the collector of transistor 70 while the source of transistor 74 is coupled to power supply conductor 78 operating at a positive potential $V_{cc}$ such as 3.0 volts. The gate of transistor 76 is coupled to the gate and drain of transistor 74. The source of transistor 76 is coupled to power supply conductor 78, while the drain of transistor 76 conducts current $I_{76}$ into node 79 at the output of signal strength comparator 34. Current mirror transistor 74 and 76 are ratio'ed such that the output current $I_{76}$ is one third of the input current from transistor 70.

The TX SAMPLE signal is applied to the base of transistor 80 that includes an emitter coupled to power supply conductor 72 and a collector coupled to the input of a current mirror circuit comprising transistors 82 and 84. Current mirror transistors 82 and 84 are ratio'ed such that the output current to transistor 86 is 1.162 times the input current from transistor 80. The gate and drain of transistor 82 is coupled to the collector of transistor 80, while the source of transistor 82 is coupled to power supply conductor 78. The gate of transistor 84 is coupled to the gate and drain of transistor 82. The source of transistor 84 is coupled to power supply conductor 78, while its drain is coupled to the input of a current mirror circuit comprising transistors 86 and 88. Current mirror transistors 86 and 88 are ratio'ed to conduct equal currents. The current mirror ratios are selected for providing the predetermined threshold that is 1.05 dB below the receive signal at node 46. The base and collector of transistor 86 is coupled to the drain of transistor 84. The emitter of transistor 86 is coupled to power supply conductor 72. The base of transistor 88 is coupled to the base and collector of transistor 86 while its emitter is coupled to power supply conductor 72. The collector of transistor 88 is coupled to the drain of transistor 76 and conducts current $I_{88}$ into node 79 for providing the GAIN CONTROL signal at the output of signal strength comparator 34.

Figure 3:
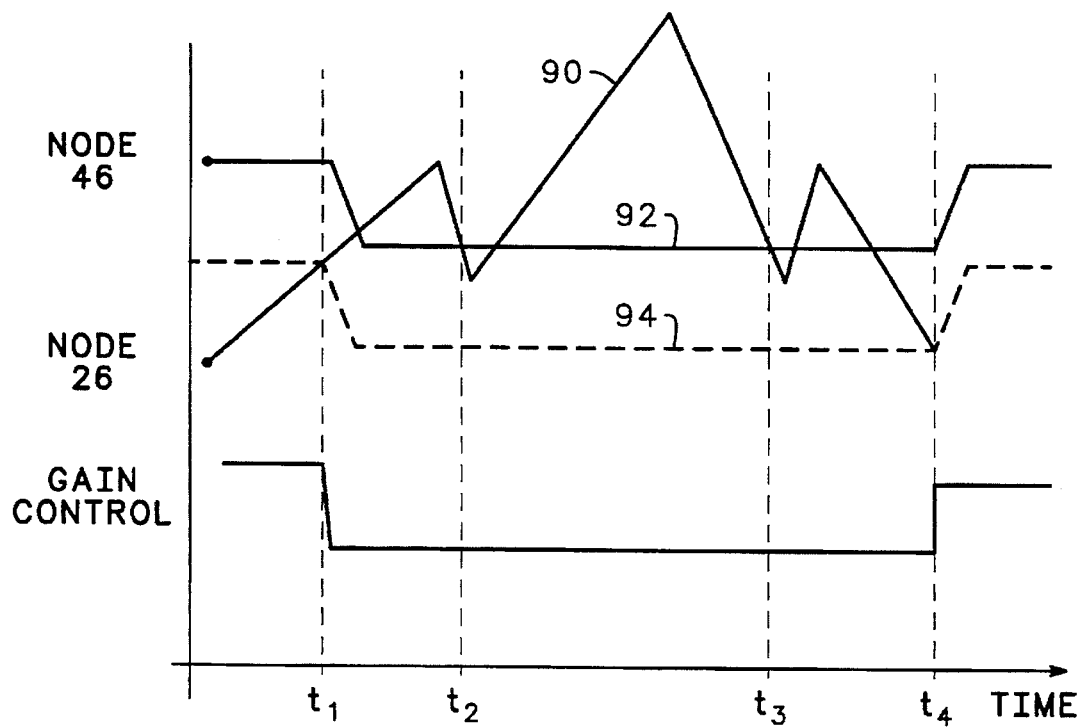
FIG. 3 is a waveform plot useful in the explanation of FIG. 1.

The operation of signal strength comparator 34 proceeds as follows. While the transmit signal at node 26 is below the predetermined threshold, the RX SAMPLE and TX SAMPLE have relative magnitudes such that current $I_{76}$ through transistor 76 is greater than the current $I_{88}$ through transistor 88 and the GAIN CONTROL signal is high. In FIG. 3, before time $t_1$, the transmit signal at node 26 (waveform 90) is less than the threshold shown by dotted line 94, i.e. 1.5 dB below the receive signal at node 46 (waveform 92). The GAIN CONTROL signal is at a high level and pre-amplifier 42 operates with higher gain because of the 1.5 dB lower signal strength in transmit signal path 12 as compared to receive signal path 14. The transmit signal is sufficiently low that any reflected sidetones in the receive signal path would not interfere with the main receive voice signal from the far talker.

Consider the example where the near talker speaks loudly into microphone 16. As the transmit voice from microphone 16 increases and the transmit signal at node 26 increases, the TX SAMPLE increases relative to the RX SAMPLE and turns on transistor 80 harder which conducts more current through current mirror transistors 82 and 84 and more current through current mirror transistors 86 and 88. At time $t_1$, the transmit signal at node 26 exceeds the threshold indicating a 1.5 dB higher signal strength in transmit signal path 12 as compared to receive signal path 14. The transmit signal is sufficiently high that any reflected sidetones in the receive signal path may interfere with the main received voice signal from the far talker, or otherwise become undesirably loud in speaker 66. The GAIN CONTROL signal goes to a low level and sets pre-amplifier 42 to a lower gain in receive signal path 14 and thereby reduce the sidetones.

Between times $t_1$ and $t_4$, signal strength comparator 34 exhibits hysteresis as shown in FIG. 3. For example, the transmit signal at node 26 drops below the receive signal at node 46 at time $t_2$ and time $t_3$ although the GAIN CONTROL output state remains low to keep pre-amplifier 42 in a low gain setting. At time $t_4$, the transmit signal at node 26 falls below the threshold indicating a 1.5 dB lower signal strength in transmit signal path 12 as compared to receive signal path 14. The GAIN CONTROL signal returns to a high level and sets pre-amplifier 42 to a higher gain as the sidetones should no longer interfere with the main received voice from the far talker, or otherwise be noticeably loud in speaker 66.

Further detail of pre-amplifier 42 is shown in FIG. 4 where the output signal from amplifier 40 passes through switching circuit 96 and feedforward capacitor 98 and switching circuit 100 to the inverting input of amplifier 102. The non-inverting input of amplifier 102 receives reference potential $V_{REF2}$ operating at 1.5 volts. Switching circuits 103 and 104 are coupled between first and second terminals of capacitor 98 and reference potential $V_{REF2}$, respectively. Feedback capacitor 105 is coupled between the output of amplifier 102 and its inverting input. The output signal of amplifier 102 passes through switching circuit 106 and capacitor 108 and switching circuit 110 to the inverting input of amplifier 112. The non-inverting input of amplifier 112 receives reference potential $V_{REF2}$. Capacitor 114 is coupled between the output of amplifier 112 and its inverting input. The output of amplifier 112 passes the receive signal to frequency inversion scrambler 44 in FIG. 1.

The output of amplifier 112 is further coupled through switching circuit 118 to one terminal of capacitor 120 at node 122. The other terminal of capacitor 120 is coupled to the intersection of capacitor 108 and switching circuit 110. Switching circuits 126 and 128 are coupled between first and second terminals of capacitor 108 and reference potential $V_{REF2}$, respectively. Switching circuit 129 is coupled between node 122 and reference potential $V_{REF2}$. Capacitor 130 is coupled between node 122 and node 132 at the intersection of capacitor 98 and switching circuit 100.

NOR logic gate 136 receives the DISABLE signal and the GAIN CONTROL signal at its inputs. The output of NOR gate 136 is coupled through inverter 138 to the gate of transistor 140. The drain of transistor 140 is coupled to node 132 while its source is coupled through capacitor 142 to the interconnection of switching circuit 96 and capacitor 98. When transistor 140 conducts, capacitor 142 is coupled in parallel with capacitor 98 for providing a modified feedforward circuit for amplifier 102. Capacitor 98 is selected at 1.0244 picofarads (pf) while capacitor 142 is selected at 0.1931 pf. More generally the ratio of capacitors 98 and 142 are selected such that the value of capacitor 98 to the sum of the values of capacitors 98 and 142 is −1.5 dB. The output of NOR gate 136 is also coupled to the gate of transistor 144 that includes a drain coupled to the source of transistor 140 and a source coupled to reference potential $V_{REF2}$.

Pre-amplifier 42 is shown as a switch capacitor low-pass filter. In one state, switching circuits 96, 100, 106, 126, and 118 close to store charges across capacitors 98, 105, 108, 114, 120 and 130, and potentially capacitor 142 if transistor 140 is conducting. In a second state, switching circuits 103, 104, 128, 110, and 129 close to transfer the charge to the output of the amplifiers. An alternate embodiment of pre-amplifier 42 (not shown) may include an amplifier with resistors in the feedforward and feedback paths to vary the gain. The GAIN CONTROL signal may switch in components in various arrangements of the feedback path and/or the feedforward path to alter the gain of the amplifier.

The operation of pre-amplifier 42 proceeds as follows. Assuming the DISABLE signal is not asserted as logic zero, a high GAIN CONTROL signal corresponding to a high gain for pre-amplifier 42 sets the output of NOR gate 136 to logic zero and the output of inverter 138 to logic one. Transistor 144 is off while transistor 140 conducts and connects capacitor 142 in parallel with capacitor 98 to add their total capacitance. The gain of amplifier 102 increases to the ratio of feedforward capacitor 98 plus capacitor 142 over feedback capacitor 105. When the transmit signal is less than the predetermined value below the receive signal, the GAIN CONTROL signal is not asserted allowing maximum amplification in the receive signal path.

When the GAIN CONTROL signal is logic zero, the output of NOR gate 136 is logic one and the output of inverter 138 is logic zero. Capacitor 142 is no longer connected in parallel with capacitor 98 as transistor 140 is non-conductive. Transistor 144 conducts to pull one terminal of capacitor 142 to reference potential $V_{REF2}$ to maintain the DC bias and charge neutrality at capacitor 142. The gain of amplifier 102 decreases to the ratio of capacitor 98 over the capacitor 105. The GAIN CONTROL signal thus decreases the gain in the receive signal path to reduce sidetones in the speaker earpiece when the signal strength in transmit signal path 12 is above the detection threshold.

When the DISABLE signal is asserted as logic one the output of NOR gate 136 is logic zero and the output of inverter 138 is logic one. Capacitor 142 is coupled in parallel with capacitor 98 to provide maximum gain of pre-amplifier 42 irrespective of the state of the GAIN CONTROL signal.

By now it should be appreciated that the present invention provides a signal strength comparator that monitors the transmit signal path and the receive signal path and asserts a gain control signal when the transmit path signal strength exceeds a threshold set to a predetermined value below the receive path signal strength. The gain control signal decreases the gain in the receive signal path to reduce undesirable sidetones in the speaker earpiece. When the transmit path signal strength is less than the predetermined threshold, the gain control signal is not asserted allowing maximum amplification in the receive signal path because the sidetone is sufficiently small as to not interfere with the main received voice signal, or otherwise become noticeably loud in the speaker.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A telecommunication circuit having transmit and receive signal paths, comprising:

a compressor coupled in the transmit signal path for compressing the dynamic amplitude range of a transmit signal, said compressor providing a transmit sample signal proportional to said transmit signal;

an expandor coupled in the receive signal path for decompressing the dynamic amplitude range of a receive signal, said expandor providing a receive sample signal proportional to said receive signal;

a comparator having first and second inputs and an output, said first input being coupled for receiving said transmit sample signal, said second input being coupled for receiving said receive sample signal, said output providing a gain control signal having a first state when said transmit signal 15 less than a predetermined threshold and a second state when said transmit signal is more than said predetermined threshold; and amplifier means coupled in the receive signal path and operating in response to said second state of said gain control signal for reducing sidetone signals in the receive signal path.

2. The telecommunication circuit of claim 1 wherein said amplifier means includes:

an amplifier having first and second inputs and an output, said first input being coupled in the receive signal path, said second input being coupled to a first reference potential;

a feedback circuit coupled between said output of said amplifier and said first input of said amplifier; and a first feedforward circuit serially coupled in the receive signal path to said first input of said amplifier.

3. The telecommunication circuit of claim 2 wherein said amplifier means further includes a second feedforward circuit coupled in parallel with said first feedforward circuit.

4. The telecommunication circuit of claim 3 wherein said feedback circuit includes a first capacitor coupled between said output of said amplifier and said first input of said amplifier.

5. The telecommunication circuit of claim 4 wherein said first feedforward circuit includes a second capacitor serially coupled in the receive signal path to said first input of said amplifier.

6. The telecommunication circuit of claim 5 wherein said second feedforward circuit includes:
 a third capacitor; and
 a switching circuit having first and second conduction terminals serially coupled with said third capacitor in parallel with said second capacitor.

7. The telecommunication circuit of claim 6 further including:
 a logic gate having first and second inputs and an output, said first input being coupled for receiving a disable signal, said second input being coupled for receiving said gain control signal;
 an inverter having an input coupled to said output of said logic gate and having an output coupled to a control input of said switching circuit; and
 a first transistor having a gate, a drain and a source, said gate being coupled to said output of said logic gate, said drain being coupled to an intersection of said third capacitor and said switching circuit, said source being coupled for receiving said first reference potential.

8. The telecommunication circuit of claim 7 wherein said switching circuit includes a second transistor having a gate, a drain and a source, said gate being coupled to said output of said inverter, said drain being coupled to said first conduction terminal of said switching circuit, said source being coupled to said second conduction terminal of said switching circuit.

9. The telecommunication circuit of claim 1 wherein said comparator includes:
 a first transistor having a base, an emitter and a collector, said base receiving said receive sample signal, said emitter being coupled to a first power supply conductor; and
 a first current mirror having an input coupled to said collector of said first transistor and having an output coupled to said output of said comparator.

10. The telecommunication circuit of claim 9 wherein said comparator further includes:
 a second transistor having a base, an emitter and a collector, said base receiving said transmit sample signal, said emitter being coupled to said first power supply conductor;
 a second current mirror having an input coupled to said collector of said second transistor; and
 a third current mirror having an input coupled to an output of said second current mirror and having an output coupled to said output of said comparator.

11. A telecommunication circuit having transmit and receive signal paths, comprising:
 circuit means responsive to a transmit signal in the transmit signal path and a receive signal in the receive signal path for providing a transmit sample signal proportional to said transmit signal and a receive sample signal proportional to said receive signal;
 a first transistor having a base, an emitter and a collector, said base receiving said receive sample signal, said emitter being coupled to a first power supply conductor;
 a first current mirror having an input coupled to said collector of said first transistor and having an output coupled to a first node;
 a second transistor having a base, an emitter and a collector, said base receiving said transmit sample signal, said emitter being coupled to said first power supply conductor;
 a second current mirror having an input coupled to said collector of said second transistor;
 a third current mirror having an input coupled to an output of said second current mirror and having an output coupled to said first node for providing a gain control signal; and
 amplifier means coupled in the receive signal path and operating in response to said gain control signal for changing gain through the receive signal path.

12. The telecommunication circuit of claim 11 wherein said amplifier means includes:
 an amplifier having first and second inputs and an output, said first input being coupled in the receive signal path, said second input being coupled to a first reference potential;
 a feedback circuit coupled between said output of said amplifier and said first input of said amplifier;
 a first feedforward circuit serially coupled in the receive signal path to said first input of said amplifier; and
 a second feedforward circuit coupled in parallel with said first feedforward circuit.

13. The telecommunication circuit of claim 12 wherein said feedback circuit includes a first capacitor coupled between said output of said amplifier and said first input of said amplifier.

14. The telecommunication circuit of claim 13 wherein said first feedforward circuit includes a second capacitor serially coupled in said transmit signal path to said first input of said amplifier.

15. The telecommunication circuit of claim 14 wherein said second feedforward circuit includes:
 a third capacitor; and
 a switching circuit having first and second conduction terminals serially coupled with said third capacitor in parallel with said second capacitor.

16. The telecommunication circuit of claim 11 wherein said first current mirror includes:
 a third transistor having a gate, a drain, and a source, said gate and drain being coupled together to said collector of said first transistor, said source being coupled to a second power supply conductor; and
 a fourth transistor having a gate, a drain, and a source, said gate being coupled to said gate and drain of said third transistor, said source being coupled to said second power supply conductor, said drain being coupled to said first node.

17. The telecommunication circuit of claim 16 wherein said second current mirror includes:
 a fifth transistor having a gate, a drain, and a source, said gate and drain being coupled together to said collector of said second transistor, said source being coupled to said second power supply conductor; and a sixth transistor having a gate, a drain, and a source, said gate being coupled to said gate and drain of said fifth transistor, said source being coupled to said second power supply conductor.

18. The telecommunication circuit of claim 17 wherein said third current mirror includes:

a seventh transistor having a base, an emitter, and a collector, said base and collector being coupled together to said drain of said sixth transistor, said emitter being coupled to said first power supply conductor; and an eighth transistor having a base, an emitter, and a collector, said base being coupled to said base and collector of said seventh transistor, said emitter being coupled to said first power supply conductor, said collector being coupled to said first node.

19. A method of varying gain in the receive signal path of a telecommunication system, comprising the steps of:

compressing the dynamic amplitude range of a transmit signal and providing a transmit sample signal proportional to said transmit signal;

decompressing the dynamic amplitude range of a receive signal and providing a receive sample signal proportional to said receive signal;

providing a gain control signal having a first state when said transmit signal is less than a predetermined threshold established by said receive signal, said gain control signal having a second state when said transmit signal is more than said predetermined threshold; and reducing sidetone signals in the receive signal path in response to said second state of said gain control signal.

20. The method of claim 19 further including the steps of:

increasing the gain in the receive signal path in response to said first state of said gain control signal; and decreasing the gain in the receive signal path in response to said second state of said gain control signal.

* * * * *

UNITED STATES PATENT AND TRADEMARK OFFICE
CERTIFICATE OF CORRECTION

PATENT NO. : 5,649,008
DATED : July 15, 1997
INVENTOR(S) : Scott K. Bader    Michael L. Gomez
              Richard E. Hester  James S. Mielke It is certified that error appears in the above-indentified patent and that said Letters Patent is hereby corrected as shown below:

Claim 1, column 6, line 53
Delete "15" and insert --is-- therefor.

Claim 19, column 10, line 8
Delete "15" and insert --is-- therefor.

Signed and Sealed this

Eleventh Day of November, 1997

Attest:

BRUCE LEHMAN

Attesting Officer

Commissioner of Patents and Trademarks